March 26, 1957     C. L. YADRO     2,786,554

TRAILER BRAKING MEANS

Filed Sept. 6, 1955

*INVENTOR.*
CHARLES L. YADRO
BY
PARKER & CARTER
ATTORNEYS

2,786,554

TRAILER BRAKING MEANS

Charles L. Yadro, Milwaukee, Wis.

Application September 6, 1955, Serial No. 532,429

1 Claim. (Cl. 188—112)

My invention relates to improvements in trailer braking means, and more particularly to a means of automatically applying the brakes on a trailer which is attached to an automotive vehicle, when the brakes on the vehicle are applied.

An object of my invention is to provide a brake arrangement on a trailer as a separate, independent unit that is self-energized by the momentum of the trailer in its relation to the automotive vehicle acting as the motive power.

Another object of my invention is to provide a means of automatically applying the brakes to the wheels of the trailer, when the motion of the trailer is arrested, due to the retarded movement of the automotive vehicle.

Still another object of my invention is to provide a device of the character described, in which the application and release of the trailer brakes is governed by snubbers.

A further object of my invention is to provide a device of the character described, in which the braking action can be made temporarily ineffective by manual control.

It is well known to anyone familiar with pulling a trailer attached to the rear end of an automobile or the like, that the momentum of the trailer causes additional pressure and strain on the brake system of the automobile when the brakes are applied. It is also well known that when the brake mechanism of the automobile is extended to the brakes of the trailer, the trailer brakes tend to have an uneven function and performance.

In carrying out my invention, I provide a separate, independent, self-energizing braking unit incorporated in the construction of the trailer, wherein the actuation of this braking unit is accomplished entirely by the momentum of the trailer relative to the motion of the automotive vehicle which is acting as the motive power when said vehicle is slowed down by its own brakes.

Figure 1:
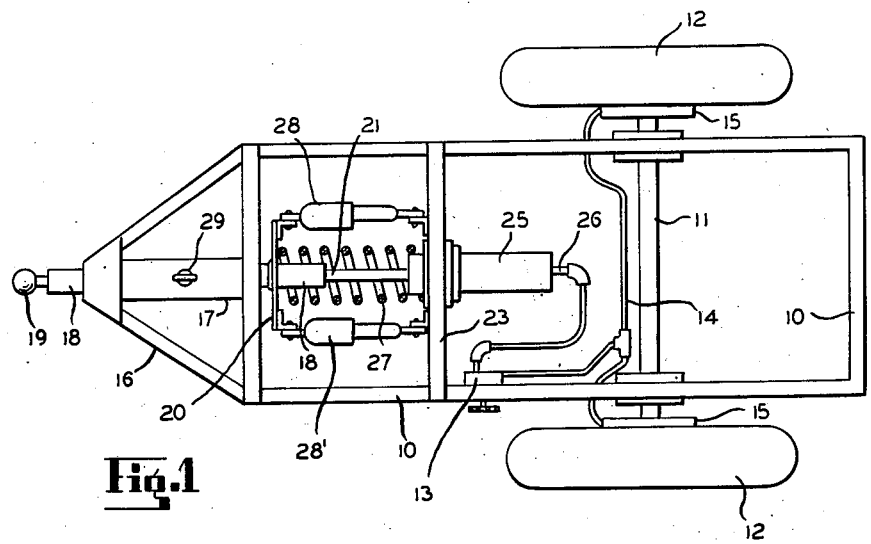
Figure 2:
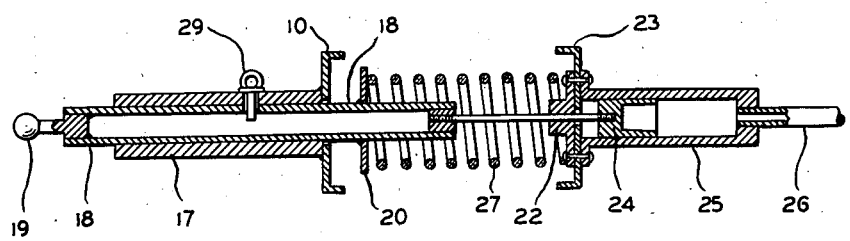

Other and further objects of my invention will become more apparent as the description proceeds, when taken in conjunction with the accompanying drawing, in which:

Figure 1 is a top plan view of a trailer chassis constructed in accordance with the invention, and Figure 2 is an enlarged detail view, in longitudinal cross section, showing the draw-bar and piston, and its relation to the hydraulic cylinder forming a part of the trailer braking mechanism.

Referring now to details of the embodiment of the invention shown in the drawing, 10 designates a frame which may be constructed of channels, angles, tubes or the like, welded or bolted to one another for supporting the trailer body. The frame 10 may be provided with the conventional springs and mounted on an axle 11, having wheels 12 on its ends as usual. A hydraulic fluid system is mounted on the frame, served from a master control valve 13, and having tubular members 14 leading to the brakes associated with the drums 15 attached to the wheels 12, thus forming a separate and independent brake mechanism mounted on the trailer.

The forward end of the frame 10 terminates in an angularly disposed section 16, to which a longitudinal tubular member 17 is attached. Said tubular member slidably supports a tubular draw-bar 18, having a hitching unit 19 at its forward end, and an outwardly extending flange or plate 20 attached near its rear end.

The draw-bar 18 has a rearwardly extending piston rod 21 attached to its extreme rear end. This piston rod passes through and is guided by a plate 22 attached to a cross member 23 forming a part of the trailer frame 10.

The rear end of piston rod 21 has a piston 24 thereon, slidable in a cylinder 25 attached to the rear face of cross member 23. This cylinder 25 forms the actuating means for the hydraulic braking system and is provided with a tubular outlet 26 leading to the master cylinder control 13, so that when the fluid within the cylinder 25 is compressed by the piston 24, it will apply pressure to the brake drums 15. The draw-bar 18 and piston 24 are normally held in their forward position by a coil spring member 27 interposed between plate 20 and plate 22. Snubbers 28, 28' are also interposed between said plates at opposite sides of the spring member 27.

From the above description it will be understood that when the draw-bar 18 is attached by its hitching unit 19 to a vehicle to be drawn by the latter (not shown) the trailer will follow the vehicle as the latter is propelled in a forward direction, but when the vehicle is slowed or stopped as by applying the conventional brakes on the vehicle wheels, the momentum of the moving trailer due to the inertia of the latter will cause the draw-bar 18 to be forced backward against the spring member 27 and the snubbers 28 and 28', so that the piston 24 compresses the fluid within the cylinder 25, to actuate the trailer brake mechanism, thereby arresting or retarding the movement of the trailer. As soon as the trailer is caused to slow down to a speed where its inertia is no longer effective, the spring 27 will again tend to release the brake by forcing the piston 24 forward within the cylinder 25 to release the hydraulic pressure on the brakes. In other words, the actuation of the trailer brakes will be responsive to variations in forward momentum of the trailer relative to the vehicle, and will be in proportion to the load carried by the trailer.

The forward and backward movement of the draw-bar and piston assembly is cushioned by the snubbers 28 and 28' which eliminates any danger of violent or quick braking action.

When it becomes necessary to move the trailer in a backward direction, it is only necessary to insert a pin 29 into registering apertures extending through the wall of the longitudinal tubular member 17 and the tubular draw-bar 18, as shown in Figure 2. This pin arrests the sliding movement of the draw-bar 18 within the sleeve 17 thereby causing the piston 24 to remain stationary within the hydraulic cylinder 25, and rendering the brake mechanism on the trailer inoperative.

Although I have shown and described a certain embodiment of the invention, it will be understood that various changes and modifications may be made without departing from the spirit and scope of the invention as defined in the appended claim.

I claim:

In a self-energizing braking unit for a vehicle trailer, a trailer frame having supporting wheels and brakes, said frame having two longitudinally spaced cross bars rigid therewith, a draw bar adapted for connection to an automotive vehicle and extending slidably through the front cross bar, a piston rod fixed to and projecting from the rear end of said cross bar, a longitudinally disposed hydraulic brake cylinder fixed on the rear cross bar into which cylinder said piston rod extends, hydraulic means operatively connecting said brake cylinder with the trailer brakes, a piston fixed on said piston rod slidable in said cylinder, a cross plate rigid with said draw bar spaced forwardly of said rearwardmost cross bar, a coil spring surrounding said piston rod and interposed between said cross plate and said rearwardmost cross bar, and a pair of snubbing devices for controlling compression of said spring disposed at opposite sides of said piston rod and connected at their opposite ends to said cross plate and said rearwardmost cross bar respectively, and means for temporarily locking the draw bar against endwise movement relative to the trailer frame.

References Cited in the file of this patent

UNITED STATES PATENTS

| | | |
|---|---|---|
| 2,162,029 | Paul | June 13, 1939 |
| 2,407,156 | Horne | Sept. 3, 1946 |
| 2,630,888 | Fikse | Mar. 10, 1953 |
| 2,716,471 | Long | Aug. 30, 1955 |